United States Patent [19]
de Nora et al.

[11] Patent Number: 4,650,552
[45] Date of Patent: Mar. 17, 1987

[54] ELECTROLYTIC PRODUCTION OF ALUMINUM

[75] Inventors: Vittorio de Nora, Nassau, The Bahamas; Jürgen F. Gauger, Geneva, Switzerland; Jean-Marie Fresnel, Thoiry, France; Iudita L. Adorian; Jean-Jacques R. Duruz, both of Geneva, Switzerland

[73] Assignee: Eltech Systems Corporation, Baco Raton, Fla.

[21] Appl. No.: 775,887

[22] Filed: Sep. 13, 1985

Related U.S. Application Data

[63] Continuation of Ser. No. 478,555, Feb. 25, 1983, abandoned.

[30] Foreign Application Priority Data

Jul. 1, 1981 [GB] United Kingdom ............... 8120237

[51] Int. Cl.⁴ .................... C25C 3/06; B29C 71/00; B05D 1/18
[52] U.S. Cl. ............................... 204/67; 204/279; 204/291; 204/243 R; 252/512; 252/519; 264/104; 264/340; 427/431; 432/443.2; 501/127
[58] Field of Search ............ 204/67, 243 R, 279, 204/291; 252/519, 512; 264/104, 340; 501/127; 427/431; 432/443.2

[56] References Cited

U.S. PATENT DOCUMENTS

| | | | |
|---|---|---|---|
| 2,480,475 | 8/1949 | Johnson | 106/57 |
| 3,328,280 | 6/1967 | Richards et al. | 204/243 |
| 3,408,312 | 10/1968 | Richards et al. | 252/518 |
| 3,459,515 | 8/1969 | Bergmann | 29/182.8 |
| 3,607,685 | 9/1971 | Johnson | 204/243 R |
| 3,661,736 | 5/1972 | Holliday | 204/67 |
| 3,829,374 | 8/1974 | Kugler et al. | 204/290 R |
| 4,098,725 | 7/1978 | Yamamoto et al. | 252/519 |
| 4,118,292 | 10/1978 | Fray et al. | 204/67 |

FOREIGN PATENT DOCUMENTS

| | | | |
|---|---|---|---|
| 1353565 | 1/1964 | France | 204/243 R |
| 51-42985 | 4/1976 | Japan | 252/512 |
| 8102170 | 8/1981 | World Int. Prop. O. | |
| 975327 | 11/1964 | United Kingdom | 501/127 |
| 545700 | 2/1977 | U.S.S.R. | 204/243 R |

OTHER PUBLICATIONS

Gibas, "Cermetals & Cermets", WNT Warszawa, 1961, pp. 214–217.

*Primary Examiner*—Howard S. Williams
*Attorney, Agent, or Firm*—John J. Freer

[57] ABSTRACT

In the electrolytic production of aluminum by electrowinning or electrorefining processes, cell components such as cathode current feeders which in use are normally covered with molten aluminum are made of a composite material of aluminum or an aluminum alloy or intermetallic compound with an aluminum oxycompound, usually alumina, and possibly containing minor amounts of additives such as borides carbides, nitrides or oxides. The composite material, which remains mechanically stable and electrically conductive at 1000° C., may be prepared by hot pressing powders at 1000°–1700° C. possibly after surface treating the alumina to improve wettability by molten Al. The components are optionally coated, e.g. with $TiB_2$. The composite materials are also useful as non-current carrying components, including separator walls, weirs, packing elements and baffles.

18 Claims, 2 Drawing Figures

ELECTROLYTIC PRODUCTION OF ALUMINUM

This application is a continuation, of application Ser. No. 478,555, filed Feb. 25, 1983, now abandoned.

TECHNICAL FIELD

This invention relates to the electrolytic production of aluminum from a fused bath, both by electrowinning and electrorefining processes, and to components of aluminum production cells as well as to methods of producing these components and of operating the cells.

BACKGROUND ART

Most aluminum is produced by the Hall-Heroult process which involves the electrolysis of alumina in a molten cryolite bath using carbon electrodes. The carbon anodes are consumed by the anodic oxidation process with the formation of $CO_2/CO$ and their life-time is very short, typically about 2-3 weeks for the pre-baked type of anode. They also add impurities to the bath. The cathodes, which are also made of carbon but have a longer life-time of more than two years, are covered with a cathodic layer of molten aluminum which has to be maintained very thick in order not to expose the carbon to the bath because the carbon is not wettable by molten aluminum. This high inventory of aluminum in the cell leads to the drawback that the electro-magnetic forces produce waves and ripples in the molten aluminum which necessitates a large interelectrode gap and a corresponding high cell voltage.

Many materials and design expedients have been suggested and tried with a view to improving the performance of electrolysis, but so far the results have not been successful. In particular, there have been numerous suggestions for aluminum-wettable cathode materials such as the refractory borides, but these materials are expensive, difficult to manufacture, and difficult to fix as a cell lining material or to coat them on less expensive substrates. Various composite materials have also been suggested for this purpose (see for example U.S. Pat. Nos. 2,480,475; 3,328,280; 3,408,312, 3,459 515 and 3,661,436) but none of these materials has proven to be acceptable.

DISCLOSURE OF INVENTION

The main aspects of the invention set out in the accompanying claims are based on the finding that a composite material formed from aluminum and an aluminum oxycompound, preferably alumina, has excellent and unexpected properties for use in the electrolytic production of aluminum from a fused bath as a component which in use is normally covered with molten aluminum, including current-carrying components such as a cathode or cathode current feeder, part of a bipolar electrode, an anode current feeder of an electrorefining cell, or any other electrically-conductive cell component such as a cell lining in contact with the molten aluminum. Non-conductive cell components exposed to the molten aluminum, including separator walls, weirs and packing elements, are also contemplated.

Some of the important characteristics of the aluminum-aluminum oxycompound composite material which make it useful in this application are:

The material is resistant to attack by molten aluminum and is noncontaminating to the aluminum produced;

It is wettable by molten aluminum and, when in contact with aluminum in molten cryolite, the material is preferentially wetted by the aluminum;

It can be made as a self-sustaining body which maintains its integrity at the operating temperatures in an aluminum production cell (from about 750° C. in a refining cell to about 1000° C. in an electrowinning cell), without the problems of fragility associated with bodies of alumina;

It has a high conductivity and maintains this conductivity at the operating temperatures (about 750°-1000° C.);

The material is more or less soluble in the molten bath, but when dissolution is likely the material can be made of aluminum-alumina, possibly with additives which are non-contaminating to the bath and to the aluminum produced.

COMPOSITION AND CHEMICAL CHARACTERISTICS

The exact composition of the composite material and its preparation will be chosen as a function of the specific intended use of the material. Usually, the starting aluminum powder will be commercially-available essentially pure aluminum of average purity 99.6 to 99.85% with the usual trace elements, although in some instances it may be preferred to use refined aluminum powder of greater purity. In other instances, the metal phase of the composite material will be an alloy or intermetallic compound consisting of aluminum (usually, but not necessarily, in a predominant amount) with at least one other metal such as the group III B metals scandium and yttrium and the rare earths including praseodynium, samarium and ytterbium; the actinides including thorium; the group IV B metals titanium, zirconium and hafnium; the group VB metals niobium and tantalum; the group VI B metals chromium, molybdenum and tungsten; manganese from group VII B; the group VIII metals iron, cobalt and nickel; and other metals such as copper and zinc from groups I B and II B respectively which modify characteristics of the metal phase (such as increasing its melting point above that of aluminum) and/or characteristics of the composite material, such as improving its wettability, electrical conductivity, and mechanical strength. High melting point alloys or intermetallic compounds such as $Al_3Ti$ will be particularly interesting in some instances where it is desired to improve the mechanical properties of the composite material at high operating temperatures in the region of 1000° C. Composites containing these alloys and intermetallic compounds will usually be provided with a protective surface coating to prevent undesired dissolution of the alloying metal into the molten aluminum: see the chapter "Surface Coatings".

When alumina is chosen as the ceramic oxycompound phase of the composite material, use will preferably be made of the usual grades of highly-purified calcined alumina powder as currently used in aluminum electrowinning where this powder is added directly to the molten bath. Use can also be made of highly pure white fused alumina with an $Al_2O_3$ content of 98.5 to 99.5%, and in some cases the less pure grades of regular fused alumina (94 to 96% $Al_2O_3$) and semi-friable fused alumina (96 to 98% $Al_2O_3$).

Other ceramic aluminum oxycompounds useful in the practice of the invention are the aluminates of lithium, sodium, potassium, beryllium, magnesium, calcium, strontium, barium, scandium, yttrium, lanthanum, hafnium, cerium, neodynium, samarium, ytterbium, thorium and other rare earths. Specific examples are the perovskite $Y_2O_3.Al_2O_3$ and the garnet $3Y_2O_3.5Al_2O_3$. These oxycompounds will preferably be employed in instances where dissolution of the composite material into the molten bath will be negligible, for example in the case of a coated dimensionally stable cathode where, even if the cathode becomes exposed to molten cryolite, the composite material does not come into direct contact with the molten cryolite. Another useful aluminum oxycompound for cathode applications is aluminum oxynitride.

The quantity of aluminum in the composite aluminum-aluminum oxycompound material will depend on the use of the material and the operating conditions. Generally, the composite materials containing 1–50% by weight of aluminum are most useful. Aluminum contents of 25 to 50% or more will be particularly useful in cathode current feeders for aluminum electrowinning or anode current feeders or cathode current feeders for aluminum electrorefining where high conductivity and wettability with aluminum are an advantage. For example, excellent results were obtained with a composite cathode containing about 84% aluminum. Composites containing only 1–5% of aluminum may be used in instances where conductivity is not a requirement, or they may be made sufficiently conductive for example by alloying to bring the total metal phase to between about 15–40 volume % of the total volume or by the addition of other conductive agents. It is also understood that the distribution of the aluminum need not be constant throughout the composite material and it is possible to use composites which are surface-enriched or surface-depleted in aluminum, as desired. The distribution of the percentages of aluminum in the composite material can thus be varied across the material to improve the resistance to attack by the molten bath or by molten aluminum and to increase the overall conductivity of the material.

The composite aluminum-aluminum oxycompound material may also include, in addition to the alloying metals as previously mentioned and the non-aluminum oxy-components of the aluminum oxycompounds, one or more of various additives, such as nitrides, borides, carbides and oxides which do not readily react with aluminum and which may modify characteristics of the composite material such as improving its wettability, electrical conductivity, and mechanical strength, or modifying its density. Fluoride additives may also be considered, for example cryolite which can be included in small quantities as a fluxing agent.

Such additives will usually be present in a minor quantity, i.e. up to 50% of the composite material, but larger quantities thereof may be present. In any event (including the particular case where additives are present in combination with a metallic phase including a dense alloying metal in a preponderant amount), the composite should always contain as a strict minimum at least 1% of aluminium in the metallic state or more if the aluminum is not alloyed and at least 10% by weight of alumina or of the aluminum oxycompound. Usually, however, in these composites containing additives, there will be 10% or more of aluminum in the metallic state and the alumina or other oxycompound will form at least 25% and often 50% or more of the composite material, whereby it forms a matrix for the aluminum or aluminum alloy or intermetallic compound and the optional additives.

The composite aluminum-aluminum oxycompound material may thus include further oxides which do not readily react with aluminum, such as the Group II A oxides BeO, MgO, CaO, SrO, BaO; the group III B oxides $Sc_2O_3$, $Y_2O_3$, $La_2O_3$; as well as $HfO_2$ and $Nb_2O_3$; rare earth oxides $CeO_2$, $Nd_2O_3$, $Sm_2O_3$ and $Yb_2O_3$; and $ThO_2$ and ThO. Such oxides should only be included when the cell component made of the composite material remains dimensionally stable in the cell environment, i.e. does not dissolve. The composite materials including these oxides are particularly resistant to attack by liquid aluminum and are therefore recommended for electrowinning cathodes and electrorefining anode and cathode current feeders. The added oxides forming a separate phase from the aluminum oxycompound will usually constitute a minor proportion of the composite material, rarely exceeding 15% of the composite material.

Also, the composite material may further comprise an agent which assists retention of the aluminum at elevated temperatures, i.e. above the melting point of aluminum, and therefore helps maintain a uniform and unchanged distribution of the aluminum in the composite material. Such an agent, which may be present in an amount of up to 5% of the composite (usually 1% or less) may be lithium, magnesium, calcium, titanium, chromium, iron, cobalt, nickel, zirconium, or hafnium, which acts on the alumina or other oxycompound and renders its surface more wettable by molten aluminum. These metallic phases may for example be produced by chemical reduction of suitable compounds, by vapour phase deposition or by a reaction sintering process starting from the respective oxides and aluminum, as will be described later. The agent may alternatively be one or more diborides of titanium, zirconium, niobium and hafnium which impede the coalescence of aluminum into liquid droplets when the material is at a temperature above the melting point of aluminum and also improve the conductivity of the material; in this instance small quantities of these additives (less than 5%) will provide an excellent wetting effect on the surface of the alumina or other aluminum oxycompound but larger quantities usually up to 50% of the material can nevertheless also be useful. A combination of both types of agent is possible.

PRE-TREATMENTS

It is also possible to improve the wettability or aluminum retaining properties of the alumina or other oxycompound by choosing a particular grain size or porous alumina or by subjecting the particles to a surface treatment prior to formation of the composite. A typical pretreatment will consist of heating alumina particles to a temperature of about 800°–1700° C., preferably 1000°–1500° C. under argon or another inert atmosphere or in a hydrogen atmosphere or under vacuum for a certain period of time depending mainly on the temperature (and usually about 2 hours at least) to provide a black colored alumina with a sub-stoichiometric surface. It has been observed that after 3 hours under vacuum at 1000° C. the contact angle of aluminum on alumina drops to below 60°. A contact angle of 30° was obtained with unpolished alumina heated to 1200° C. under vacuum and this contact angle was maintained after cooling to 1000° C. under argon. Another treatment is ion bombardment of the particles in vacuum, for example at an elevated temperature. It is also possible to heat-treat the particles for several hours at about 900°

C.–1500° C. in the presence of liquid aluminum, which has the effect of partly removing hydroxyl groups which are strongly bonded to the surface of the alumina or other oxycompound. The pretreatment may also include the application of one or more of the aforesaid agents on the surface of the alumina or other oxycompound in such a small quantity that they are virtually undetectable in the final composite material.

COMPOSITION: PHYSICAL CHARACTERISTICS

The composite material may be made up of particles of any suitable shape and size, particle sizes or diameters of about $0.1–200\mu$ being the most common both for powders and fibers. Typical powder size for both the aluminum and the alumina or oxycompound would be $5–100\mu$ diameter. Conveniently, both powders will have the same dimensions although a fine powder of alumina mixed with a coarse powder of aluminum is useful. In some cases, it is not recommended to use a very fine powder of aluminum with a coarse powder of alumina or other oxycompound when the formation technique involves pressing at elevated pressures. When high melting point alloys or intermetallic compounds of aluminum are to be used, particles of the alloy may be used as the starting material, or particles of aluminum and the additive metal or its oxide can be mixed in the desired proportion with the alumina or oxycompound or other oxide powder, so that the alloy or intermetallic compound is formed during subsequent heat treatment for formation of the composite. Likewise, particles of the aforementioned agents and additive oxides may be included in the mixture from which the composite material is made.

When the composite material is made into a self-sustaining or semirigid body, for example by a hot-pressing process, its density can be chosen by setting the process parameters. Generally, high densities approaching 100% of the theoretical density of the composite material will be desirable when insoluble or substantially insoluble materials are required. Densities ranging from 65–95% of the theoretical density will generally be useful, although possibly only the surface of the body may have such a high density. However, for bodies of the composite material enclosed in a protective casing, densities as low as 50% of the theoretical density or even lower may be acceptable. In particular, using fine grained alumina ($<1\mu$) with coarser aluminium ($\sim 10\mu$) in a weight ratio of 70:30, an electrically conductive self-sustaining body was obtained with a density of only 36% the theoretical density.

The composite aluminum-aluminum oxycompound materials used for current-carrying components exhibit metallic conductivity and maintain this metallic conductivity at the elevated operating temperatures of about 750°–1000° C. This metallic conductivity is generally attributed to the presence of residual aluminum (possibly as an alloy or an intermetallic compound) which acts as conductive binder. Nevertheless, conductivity can be promoted by other mechanisms. For example, the creation of oxygen deficiencies in the oxycompound lattice possibly promotes semiconductivity and wettability. However, the conductivity will usually be due to residual aluminum which acts as a conductive binder. In a pressed or sintered aluminum-alumina composite in which conductivity is provided solely by the aluminum as binder, it is estimated that the minimum quantity of aluminum would be about 12% and the usual quantities would be about 20–40% to provide good conductivity. In general terms, the metallic phase, i.e. aluminum, or an aluminum alloy or intermetallic compound, would occupy about 15–40 volume % of a pressed or sintered composite to provide adequate conductivity. However, it has been observed that plasma-sprayed aluminum-alumina composites may be conductive with low aluminum contents (less than 15%) and it is possible that their conductivity is enhanced by the high temperature treatment in the plasma arc.

PREPARATION

In most cases, the composite material is simply formed by mixing together particles of aluminum and alumina and/or other aluminum oxycompound in the desired ratio (possibly with up to 5% of one or more of the aforementioned agents, or with an alloying powder or other additive in an appropriate amount usually not exceeding 50% of the total) and subjecting the mixture to heat treatment.

The particles may be heat treated under an inert atmosphere or vacuum at a temperature just below the melting point of the aluminum (or of the alloy used) so as to sinter the particles together. However, it is preferred that the heat treatment should be continued above the melting point of aluminum, for example up to about 1000° C.–1500° C. or even up to temperatures approaching the melting point of the alumina or aluminum oxycompound.

Conveniently, the particles will be mixed and cold-pressed prior to the heat treatment, or they may be mixed and directly hot-pressed. Typically, cold-pressing will be carried out at elevated pressure (about 1–3 tons/cm$^2$, for example) and a short time of several seconds. Hot-pressing will be at the same or a lower pressure (about 100–300 Kg/cm$^2$, for example) for a period of several minutes to several hours. Generally, longer periods for the hot-pressing treatment will be useful for the production of self-sustaining bodies which remain dimensionally stable under the operating conditions. Cold-pressing at a pressure of about 2 tons/cm$^2$ followed by hot-pressing at 200 kg/cm$^2$ for 30 minutes under argon, and at temperatures ranging from about 600° C. to 750° C. gave adequate results in preliminary tests, but improved results have been obtained by cold pressing followed by heating under argon at 1100°–1500° C. for several hours. Unidirectional pressing has given good results but higher densities can be achieved by isostatic pressing, in particular hot isostatic pressing at 1000°–1500° C.

When the particles of alumina or other aluminum oxycompounds have been pretreated under vacuum or inert atmosphere to prepare their surfaces, it is preferable to mix them with the aluminum particles and carry out the heat treatment without exposure of the surface treated alumina or oxycompound particles to air or moisture.

Many variations are possible on the process parameters used in the described methods involving pressing prior to and/or during the heat treatment and other methods may be used to produce the composite electrically-conductive material, particularly when it is not necessary to form the composite as a compact self-sustaining body.

In another convenient manufacturing process, the cell component such as a cathode current feeder or a cell liner can be preformed by coldpressing into a rigid self-sustaining body which is transported to the site of the electrolytic cell and is submitted to heat treatment just prior to fitting in the cell.

Another method of forming the composite is to plasma-spray the mixture of aluminum and alumina or other oxycompound particles onto a support. This support may, for example, be the bottom of a cell lining on which the plasma-sprayed composite forms a conductive and aluminumwettable surface, or it may be an inert core of a packing element. The support could alternatively be a temporary one from which the plasmasprayed material is removed and comminuted for further use.

A modified method of making the composite aluminum-aluminum oxycompound materials is to react aluminum with suitable oxides so as to produce the alumina or other aluminum oxycompound in situ as a composite material with excess, unreacted aluminum and a reduced form of the starting oxide(s). Examples of oxides that can be used as starting material in this method are $CuO$, $FeO$, $Fe_2O_3$, $Fe_3O_4$, $NiO$, $TiO_2$ and $MnO_2$. These oxides may be used alone, in mixtures or mixed with alumina or another aluminum oxycompound. The reaction may take place by mixing these oxides in particulate form with particulate aluminum, and heating usually with applied pressure in the same manner as previously described in order to produce a "reactive sintering". For instance, starting from $FeO$, the following reaction may take place:

$$2FeO + 19/3Al \rightarrow \tfrac{1}{3}Al_2O_3 + Fe_2Al_5$$

By adjusting the excess of aluminum in the mixture, and by preferably also providing some additional alumina in the starting powders to increase the overall amount of alumina, a composite material of alumina and a desired aluminum/iron alloy or intermetallic compound is obtained. Further examples of reactive sintering reactions are:

$$3NiO + 5Al + 2Al_2O_3 \rightarrow 3Al_2O_3 + 3NiAl \quad (a)$$

$$3NiO + 3Al \rightarrow Al_2O_3 + Ni_3Al \quad (b)$$

$$3TiO_2 + 3Al_2O_3 + 13Al \rightarrow 5Al_2O_3 + 3Al_3Ti \quad (c)$$

Oxides or mixtures for reactive sintering with aluminum can also be prepared by the precipitation or coprecipitation of salts which are then thermally transformed into intimately-mixed oxides followed by reactive sintering with aluminum.

A feature of the composite materials produced in this way by simple reactive sintering or by thermal decomposition followed by reactive sintering is that the alumina produced in situ is perfectly wetted by the aluminum and other metals present; the best wettability is obtained when titanium, nickel or iron oxides are included in the starting materials. Furthermore, composite materials produced in this way may have a high electrical conductivity and a high melting point of the metal phase.

In another preparation method, an aluminum-alumina composite is first prepared with an appropriate heat treatment and ground to a powder. This composite powder is then mixed with oxide(s) for reactive sintering between the oxide(s) and aluminum, possibly with other additives such as zirconium diboride and/or titanium diboride, and the mixture is compacted into a self-sustaining body with or without extra heat treatment.

SURFACE COATINGS

The surface of the composite aluminum-aluminum oxycompound material may be in direct contact with the molten electrowon aluminum cathode and occasionally with the molten bath. However, it has been found that the composite material is also very useful if coated with an appropriate coating which comes into contact with the molten aluminum, e.g. an electrowon aluminum cathode. This applies for example to cathode current feeders which may be coated with materials such as titanium diboride and other refractory borides having enhanced wettability by molten aluminum. These coatings may be applied to the composite material by an convenient method.

With the composite aluminum-aluminum oxycompound materials coated in this way, large stresses are not generated at the composite material/coating interface when the components are heated or cooled between room temperature and the operating temperature of about 750°-1000° C., so that the coating remains intact despite this thermal cycling. Furthermore, if the coating should become damaged or worn, the underlying composite aluminum-aluminum oxycompound material will withstand contact with the molten aluminum and in the case of an alumina-aluminum composite material will be essentially non-contaminating to the aluminum and to the bath.

Also, for cell components which do not have a permanent protective surface coating, in order to protect the composite body from exposure to the ambient air which could deteriorate for example the aluminum wettability of the surfaces during transport from the site of manufacture of the composite to the electrolytic cell, it is convenient to encase the body in an aluminum sheath. This can be achieved for example by dipping the body in molten aluminum and allowing molten aluminum adhering to the surface to cool. When the body is placed in the aluminum production cell, the protective aluminum surface will simply melt without causing any inconvenience to the cell operation.

GEOMETRICAL CHARACTERISTICS

The cell components according to the invention may be made of single bodies of the composite material, as for example blocks of the material forming a cathode current feeder, or complex shapes forming a unitary cell lining. Because of the excellent mechanical properties of the composite material which combines the ductility of aluminum with the strength of alumina, bodies of the material can be easily machined to the desired shapes. Alternatively, the components may be made up of several pieces of the material assembled in an appropriate matter, as by welded or by hot-pressing.

In an aluminum electrowinning cell, typically the cathode or cathode current feeder will be placed under the anodes and will have a horizontal or substantially horizontal surface from which the electrowon aluminum is drained. Alternatively, consumable anodes or relatively dimensionally-stable oxygen-evolving anodes may protrude down into recesses between cathode current feeder elements of the composite material, these elements having perpendicular or inclined surfaces facing the anodes and down which a thin film of the electrowon aluminum runs.

Another particular cathode arrangement is a packed bed of aluminum-wettable packing elements which may be disposed in a cathodic pool of electrowon aluminum in an aluminum electrowinning cell so as to reduce the waves and ripples caused by electromagnetic forces (see PCT published patent application WP-8102170). These packing elements may have random shapes, or be tubes, rods, saddles, raschig-rings and so forth made of the composite material according to this invention. Advantageously, composites with good electrical conductivity will be used for these packing elements; however, since electrical conductivity is not a requisite of the packing elements, composite materials with a low aluminum content are also useful. Packing elements of the composite alumina-aluminum material can also be used as a packed bed electrode in vertical divided electrorefining cells of the type described in U.S. Pat. No. 4,118,292. As a variation, these packing elements of electrowinning or electrorefining cells may consist of the composite material with an aluminum-wettable surface coating e.g. of $TiB_2$ or they can be made of refractory materials which are surface-coated with the electrically-conductive and aluminum-wettable composite aluminum-aluminum oxycompound material, in particular those composites containing refractory boride additives.

CELL OPERATION

The invention pertains to aluminum production by the electrolysis of various molten baths containing various aluminum compounds, using components of the composite material which in normal use remain covered by molten aluminum. However, it is understood that the components may occasionally (for instance if the level of an electrowon aluminum pool is lowered and partly exposes the components) or accidentally become exposed to the molten bath when the surface film of aluminum on the component is removed. In this case, the exposed composite material may dissolve in the bath. Any components which are subject to this risk will preferably be made of alumina-aluminum, possibly with non-contaminating additives, so that dissolution will not contaminate the bath.

The above considerations apply to the conventional alumina-cryolite bath and to others baths. One example is lithium/potassium-based fluoride melts containing up to about 2% of alumina. Another example is chloridebased melts such as $KCl$ -$NaCl$ - $AlCl_3$ or a melt containing about 3–7% $AlCl_3$, 53% $NaCl$, 40–42% $LiCl$, 0–0.5% $MgCl_2$, 0–0.5% $KCl$ and 0–1.0% $CaCl_2$ at a temperature of 700±30° C., in which alumina has a very low solubility.

In aluminum electrowinning, high current density operation will be facilitated by using the composite material according to the invention as cathode or cathode current feeder, on account of its excellent wettability by molten aluminum, so that only a thin layer of aluminum need remain on the cathode of composite material, thus permitting a reduced interelectrode gap. With these new cathode current feeders of composite material combined with oxygen-evolving anodes which will preferably be substantially dimensionally stable, it will be possible and advantageous to operate the cell at high current densities of the order of 20–50 $kA/m^2$ (compared to the usual current densities of about 10 $kA/m^2$ or less with conventional carbon anodes and cathode current feeders) while maintaining a low cell voltage and thereby obtaining a low specific energy consumption per ton of electrowon aluminum. Operation with oxygen-evolving anodes and the new cathodes or cathode current feeders incorporating the composite material at anode current densities lower than 20 $kA/m^2$ is also possible. Of course, the thermal insulation of the cell will be adapted to the current density and other factors affecting heat dissipation.

Another process to which the invention applies is the electrorefining of aluminum. Present-day processes are capable of producing aluminum of purities up to 99.999%. In the process in which aluminum is refined with a porous alumina separator containing a fused salt (i.e. without a salt bath forming a thick separate layer), the composite material would be ideal as an anode current feeder and as a cathode current feeder. The composite material is also useful in the process which is usually carried out with a three-layer floating electrode arrangement, for example with a dense aluminum/copper layer as anode on which floats an intermediate layer of fused-salt electrolyte (usually a fused alkali-alkaline earth chloro-fluoride electrolyte containing aluminum ions, e.g. cryolite and aluminum fluoride with either barium chloride or a mixture of calcium and barium fluorides at about 750° C.), and above that a less-dense layer of pure aluminum into which the graphite cathodes dip.

Thus, according to the invention, in an aluminum refining cell, the graphite cathode current feeders are replaced by a composite aluminaaluminum material the components of which are very pure so that no traces can become dissolved in the molten aluminum cathode. Thus, the composite will contain refined aluminum of the purity expected from the refining cell.

The described composite aluminum-aluminum oxycompound materials can be incorporated into aluminum electrowinning and refining cells of traditional design with appropriate dimensional adjustments, in particular with narrowing of the interelectrode gap in the case of an electrowinning cell. In this context, it should be noted that for current feeders, the composite material provides excellent contact with the usual types of bus bars of steel or other materials.

The composite aluminum-aluminum oxycompound materials thus have outstanding and unexpected properties making them useful in aluminum production as current-carrying components but the described aluminumaluminum oxycompound materials can also be used as non-current carrying cell components of aluminum-production cells such as separator walls, weirs for overflowing molten aluminum, packing elements, baffles and other structural components, which are in contact with the molten aluminum. These components may be bodies of the composite material, optionally containing additives and surface coatings as previously described, or may for example be alumina coated with the composite material as aluminumresistant components such as packing elements.

PREFERRED MODES OF CARRYING OUT THE INVENTION

Figure 1:
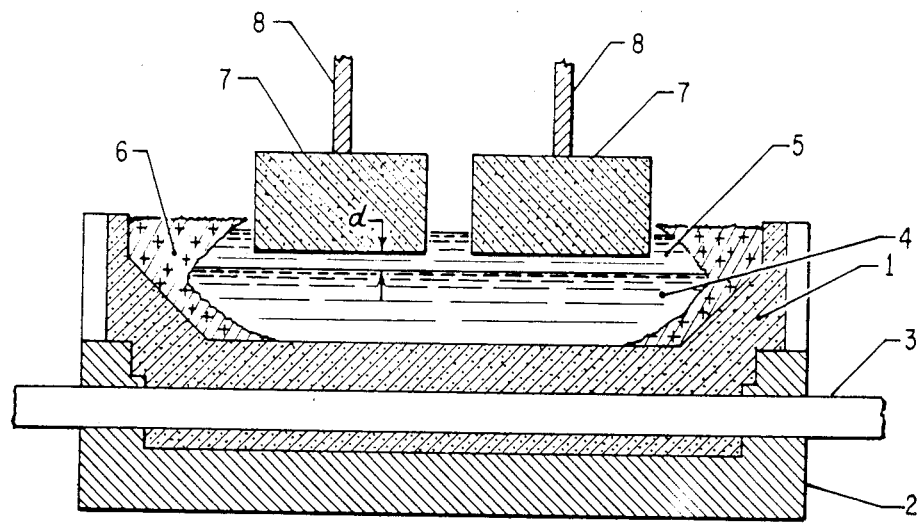
FIG. 1 is a schematic cross-sectional view of a conventional aluminum electrowinning cell.

FIG. 1 schematically shows a conventional aluminum electrowinning cell comprising a carbon liner 1 in a heat-insulating shell 2, with a cathode current bar 3 embedded in the liner 1. Within the liner 1, is a cathodic pool 4 of molten aluminum and an alumina-based molten cryolite electrolyte 5 at a temperature of 940° C.–1000° C., usually 955° C.–980° C. This electrolyte consists of sodium cryolite ($Na_3AlF_6$) as major component with about 4–10% of calcium fluoride, about 2 to 5% of aluminum fluoride and about 2 to 8% of alumina. The aluminum pool 4 and molten electrolyte 5 are surrounded by a crust or freeze 6 of the solidified electrolyte. Anodes 7, consisting of prebaked blocks of carbon and suspended by anode current feeders 8, dip into the molten electrolyte 5 above the cathodic aluminum pool 4 with a variable spacing d above the surface of the pool.

For example, such a cell may contain 6–10 rows of 2 anodes measuring about 60×40×40 cm for small cells to about 150×100×70 cm for large cells. In operation, the pool 4 of a cathodic aluminum is maintained with a depth of about 15–20 cm and the anode-cathode spacing d is usually held between about 4 and 5 cm. It is not possible to use smaller spacings d because of the ripple effect on the surface of pool 4, produced by electromagnetic forces.

In use of the cell, the carbon anodes 7 are consumed and must be replaced periodically, about every 2 or 3 weeks, and the cell liner 1 acting as current feeder has a useful lifetime of two years or more, frequently between 3 and 6 years. The operating anode current density is usually between 6 and 10 $kA/m^2$.

Figure 2:
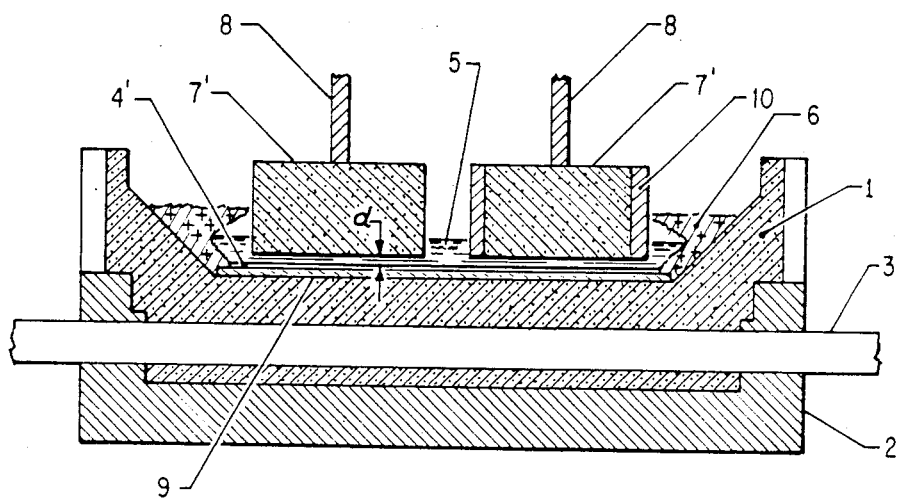
FIG. 2 is a similar view showing such a cell converted in accordance with the invention by retrofitting with elements of the composite material.

FIG. 2 illustrates how the conventional cell of FIG. 1 may advantageously be converted using the composite material according to the invention in a manner to improve the process efficiency and the product purity. For convenience, in FIG. 2, the same parts are designated by the same references as in FIG. 1, with a "prime" when the part is substantially modified.

In the modified cell of FIG. 2, the bottom of the carbon liner 1 has been covered with a layer 9 of the composite aluminum-aluminum oxycompound material according to the invention. As illustrated, this layer 9 consists of slabs of the composite material between 0.5 and 5 cm thick, for example 1 cm thick. When these slabs are fitted, the gaps between the slabs can be filled with strips and/or particles of the same composite material and the slabs then welded together. Instead of slabs of the composite material, it is possible to plasma-spray the composite material onto the surface of liner 1 to form a conductive coating about 0.2 to 1.0 mm thick. Such a plasma-sprayed coating may also be used to improve contact between the carbon liner 1 and slabs of the composite material. The composite material of the slabs may be prepared by the previously-described hot-pressing method, and typically this material will be an alumina-aluminum composite containing 25–50% aluminum. It may optionally contain an additive enhancing aluminum wettability e.g. $TiB_2$.

The layer 9 of composite material may be applied to a new carbon liner 1 or to a used carbon liner which is not too badly damaged. For used liners 1 whose bottom has become uneven, it will be necessary to first level the surface of the bottom by compacting in powdered conductive material, either carbon or particles of the composite alumina-aluminum material.

By using this layer 9 of the composite material as an operative aluminum-wettable surface in contact with the cathodic aluminum, the prior-art deep pool 4 of aluminum can be replaced by a relatively thin layer of film 4'. Such a layer may conveniently be held by appropriate restraining means at a desired constant thickness, e.g., up to about 1 cm, of if no restraining means is used a thin film typically less than 1 mm will form. In both cases, molten aluminum is continuously drained off. If desired, the upper face of the slabs of composite material can be coated with a layer of an aluminum-wettable material such as titanium diboride, preferably a very compact layer.

Instead of slaps of the composite material forming a relatively thin layer 9, it is also possible to provide bodies of the composite material facing the anodes 7'. These cathode bodies are thus spaced apart to allow for drainage of the aluminum from the cathodic upper face.

The cell may incorporate the same carbon anodes 7 or may be further modified by replacing the carbon anodes 7 with oxygen-evolving anodes 7' which remain relatively dimensionally stable. Optionally, these anodes 7' may have a protective and/or re-inforcing casing 10 e.g. of alumina.

Using these anodes 7' in combination with the cathodic layer 9, the gap d between the anode surface and the aluminum film 4' can be reduced to about 2–2.5 cm. When the anodes wear away, this gap can be held constant by the recently-developed computer-controlled anode feed devices. Working at the same anode current density as in a conventional cell, this narrowed gap may account for an energy saving of the order of 20% of the consumed electrical energy whereas further energy savings of the order of 2–3% may be achieved when the composite material replaces a substantial part of the carbon cell lining.

The preparation of composite materials for use as cell components according to the invention will be further illustrated by the following Examples.

EXAMPLE I

Cerac (Trademark) calcined alumina, 99.9% pure and grain size less than 40μ was mixed in a 60:40 weight ratio with 99.5% pure aluminum particles also of grain size up to 40μ.

The mixture was milled overnight in a ball mill using alumina balls and the resulting uniform powder, average grain size up to about 10μ, was cold pressed under vacuum with a uniaxial pressure of 2.6 ton/cm². This produced a self-sustaining body which was heat treated in argon at 1200° C. for 12 hours. Small quantities of aluminum coalesced at the extremities of the body which was found to contain 36% aluminum. The body had a density of 76% the theoretical density (TD) and exhibited metallic conductivity.

The above procedure was repeated using Cerac (Trademark) fused alumina 99.5% purity of the same grain size. The resulting body after heat treatment was found to contain 32% aluminum and had a density of 71% TD. It also exhibited metallic conductivity.

EXAMPLE II

The procedure of Example I was repeated using Cerac (Trademark) 99% pure fused alumina containing 97% $Al_2O_3$ and 3% $TiO_2$, of the same grain size. The final body contained 35% aluminum, had a density of 82% TD and exhibited metallic conductivity.

A further series of composite alumina-aluminum bodies produced in the same manner had a density of 66–67% TD. One of these bodies was mounted in a dense alumina tube and was immersed for 1 hour in molten cryolite saturated with alumina (10%) at 1000°

C. under an argon atmosphere. After removal, practically no change in the body could be observed; in particular it maintained a uniform aluminium distribution and exhibited metallic conductivity. This demonstrates that a cell component of this composite material will resist occasional contact with a molten cryolite bath.

EXAMPLE III

The preparation procedure of Example II was repeated with the addition of Cerac (Trademark) niobium diboride powder, 99% purity, grain size up to 40μ. The $Al_2O_3.TiO_2$ :Al: $NbB_2$ weight ratio was 60 :40 :5. The final body had a density of 61% TD and exhibited metallic conductivity.

EXAMPLE IV

Example III was repeated using 70 parts by weight of calcined alumina 99.9% purity, 30 parts by weights of aluminum and 1, 5 or 10 parts by weight of $NbB_2$. The final bodies had a density of 57-59% TD and all exhibited metallic conductivity. One specimen containing 5 parts by weight of $NbB_2$ was mounted in an alumina tube and immersed in molten aluminum at 1000° C. under an argon atmosphere for 24 hours. The specimen showed no evidence of modification.

EXAMPLE V

Example IV was repeated with an $Al_2O_3$ :Al :$NbB_2$ weight ratio of 33 : 30 : 37 (the $Al_2O_3$ and $NbB_2$ are in an equimolar ratio). The composite bodies obtained had a density of 57-58% TD and exhibited metallic conductivity.

EXAMPLE VI

Example V was repeated replacing $NbB_2$ with $TiB_2$. The $Al_2O_3$ : Al : $TiB_2$ weight ratio was 41.5 : 30 : 28.4 ($Al_2O_3$ and $TiB_2$ equimolar). The density was 67% TD and the bodies exhibited metallic conductivity.

The procedure was repeated with the $Al_2O_3$ : Al : $TiB_2$ weight ratio 44.5 : 10 : 45.5 (1 mol $Al_2O_3$ : 1.5 mol $TiB_2$) and 38 : 10 : 52 (1 mol $Al_2O_3$: 2 mol $TiB_2$). In both cases, the density was 56% TD and the composite bodies exhibited metallic conductivity.

EXAMPLE VII

The preparation procedure of the above examples was repeated using calcined alumina and aluminum of grain size <40μ and Fluka (Trademark) anatase $TiO_2$ powder, grain size <1μ. The quantities were chosen to carry out the following reaction sintering (which takes place above about 900°-1000° C.):

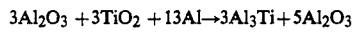
$$3Al_2O_3 + 3TiO_2 + 13Al \rightarrow 3Al_3Ti + 5Al_2O_3$$

The resulting sintered body had a density of 52% TD and exhibited metallic conductivity and excellent mechanical properties. Inspection of the sample by SEM/EDX analysis mapping and XRD revealed the presence of a two-phase composite consisting of alumina and the intermetallic compound $Al_3Ti$ (m.p. 1340° C.); metallic aluminum and titanium and titnaium dioxide were not detected.

EXAMPLE VIII

A tube of Degussit (Trade Mark) "Al 23" alumina, purity 99.5% $Al_2O_3$, density approx 3.7 g/ml and zero open porosity, having an internal diameter 8 mm, external diameter 12 mm and length 4 cm was cleaned by ultrasounds in isopropyl alcohol then heated in air at 500° C. for 2 hours.

Powders of aluminum 99.9% purity and alumina 98.5% purity both with a nominal grain size of up to 40μ were mixed in a weight ratio of 25 : 75 and milled overnight in a ball mill using alumina balls. The resulting uniform powder, grain size up about to 10 u, was placed in the tube and the ends were closed by closely fitting alumina rods. The powder was cold pressed at a pressure of approx. 30 kg/cm². The assembly was then placed in graphite blocks in an induction heater, under an Argon atmosphere, and heated rapidly (during 10 minutes) up to approx. 1700° C. for 15 minutes. After cooling, the tube was cut and revealed an excellent sintered bond between the inner surface of the alumina tube and the alumina/aluminum composite core. The core exhibited metallic conductivity and was approx. 65% of the theoretical density of the composite material. It was also observed that there was no trace of coalescence of aluminum at the extremities of the sintered core.

The obtained composite material bonded in a protective alumina tube is excellently suited as a cathode current feeder; if desired, the outer surfaces of the tube can be coated with a composite alumina-aluminum material by plasma spraying (see Example IX), or with another aluminumwettable material, e.g. $TiB_2$.

In a modification of this example, the density of the composite material core may be increased by applying pressure during the induction heating.

EXAMPLE IX

Alumina powder, grain size 5-20 u, and aluminum powder, grain suze 45-75μ, were mixed in weight ratios of 85 : 15 and 70 : 30. These powders were plasma-sprayed onto alumina tubes (Degussit "Al 23") of diameter 12 mm and 20 mm. A thickness of approx. 50 u was achieved with a 10 second spraying time, and thicker coatings can be obtained as desired. The composite coatings were very dense (>85% TD) and all had metallic conductivity. The coated alumina specimens are well suited as packing elements in a molten aluminum cathode.

We claim:

1. A method of electrorefining aluminum comprising cathodically forming purified molten aluminum in an electrorefining cell, characterized in that at least a part of the cell in contact with the purified aluminum is made of a composite alumina-aluminum material composed of alumina and aluminum of pure grades.

2. An aluminum production cell comprising a component which in use is normally covered with molten aluminum, said component comprising at least one body having a surface and/or an inner part made of a composite aluminum-alumina material consisting essentially of 10-50 % by weight of essentially pure aluminum in the metallic state and the balance alumina of at least 98.5% purity.

3. An aluminum production electrolysis cell comprising one or more components with a surface and/or inner part made of a composite aluminum-aluminum oxycompound material as claimed in claim 2.

4. A method of producing aluminum by electrolysis in an electrowinning or an electrorefining cell, characterized by using a cell component with a surface and/or inner part made of a composite aluminum-aluminum oxycompound material as claimed in claim 2.

5. The method of producing aluminum of claim 4, in which the cell component is a cathode or cathode current feeder with a substantially horizontal surface which is drained to maintain a thin film of aluminum.

6. The method of producing aluminum of claim 4, in which the cell component is a cathode or cathode current feeder with a perpendicular or inclined surface facing an anode and down which a thin film of aluminum flows.

7. An aluminum production cell comprising a component which in use is normally covered with molten aluminum, said component comprising at least one body having a surface and/or inner part made of a composite material consisting essentially of:
 (a) essentially pure aluminum in the metallic state in an amount of 10–50% by weight of the composite material,
 (b) alumina in an amount whereby the total of (a) and (b) amounts to at least about 95% by weight of the composite material, and
 (c) up to about 5% by weight of the composite material of an agent assisting retention of aluminum at elevated temperatures, said agent being selected from lithium, magnesium, calcium, titanium, chromium, iron, cobalt, nickel, zirconium, hafnium and/or one or more diborides of titanium, zirconium, hafnium and niobium.

8. An aluminum production cell comprising a component which in use is normally covered with molten aluminum, said component comprising at least one body having a surface and/or inner part made of a composite material consisting essentially of:
 (a) essentially pure aluminum in the metallic state in an amount of 10–50% by weight of the composite material,
 (b) alumina in an amount of at least 10% and preferably at least 25% by weight of the composite material, the total of components (a) and (b) being at least about 50% by weight of the composite material, and
 (c) at least one nitride, boride, carbide and/or oxide which does not readily react with molten aluminum and which is selected from the groups consisting of hafnium, niobium and the Group IIA, IIIB and the rare earth oxides and their mixtures, wherein the total quantity of (c) is no more than about 50% and the oxide component thereof is no more than about 15% by weight of the composite.

9. The aluminum production cell of claim 2, 7 or 8 in which the composite material is an electrically conductive part of a current-carrying component.

10. The aluminum production cell of claim 2, 7 or 8, in which the component is a cathode or cathode current feeder.

11. The aluminum production cell of claim 2, 7 or 8, in which the component is an anode current feeder of an aluminum electrorefining cell.

12. The aluminum production cell of claim 2, 7 or 8, in which the component is a current carrying part of a cell lining.

13. The aluminum production cell of claim 2, 7 or 8, in which the component is a separator wall, weir, packing element or baffle.

14. The aluminum production cell of claim 8, in which the composite material is obtained by reacting aluminum with one or more suitable oxides to produce alumina in situ with an excess of unreacted aluminum and a reduced form of the starting oxide(s).

15. The aluminum production cell of claim 2, 7, 8 or 14, in which the composite material is obtained by hot pressing particles at a temperature of from about 1000° C. to about 1600° C.

16. The aluminum production cell of claim 2, 7, 8 or 14, in which the composite material is obtained by cold pressing particles into a pre-formed body and subjecting the pre-formed cold pressed particles to heat treatment prior to fitting the component in the cell or in situ in the cell.

17. The aluminum production cell of claim 2, 7 or 8 in which an exposed surface of the component is at least partly coated with another aluminum wettable material.

18. The method of preparing a component which in use is normally present in an aluminum production cell and covered with molten aluminum, said component comprising at least one body having a surface and/or an inner part made of a composite aluminum-alumina material, which method comprises:
 (a) selecting an essentially pure alumina of sufficient porosity to provide 10–50 weight percent aluminum in the metallic state within said component;
 (b) pretreating said porous alumina at a temperature within the range of from about 800° C. to about 1700° C. under vacuum, or inert or reducing atmosphere; and
 (c) contacting the resulting pretreated porous alumina with essentially pure molten aluminum in an amount sufficient to prepare said composite aluminum-alumina material containing said 10–50 weight percent of aluminum in the metallic state.

* * * * *